(12) United States Patent
Ohr

(10) Patent No.: US 7,024,527 B1
(45) Date of Patent: Apr. 4, 2006

(54) DATA RESTORE MECHANISM

(75) Inventor: James Philip Ohr, St. Paul, MN (US)

(73) Assignee: VERITAS Operating Corporation, Mountain View, CA (US)

( * ) Notice: Subject to any disclaimer, the term of this patent is extended or adjusted under 35 U.S.C. 154(b) by 327 days.

(21) Appl. No.: 10/623,384

(22) Filed: Jul. 18, 2003

(51) Int. Cl.
*G06F 12/00* (2006.01)

(52) U.S. Cl. ............ 711/161; 100/154; 100/162

(58) Field of Classification Search .......... 711/100, 711/154, 161, 162; 709/201, 203; 714/13
See application file for complete search history.

(56) References Cited

U.S. PATENT DOCUMENTS

| | | | |
|---|---|---|---|
| 5,907,672 A * | 5/1999 | Matze et al. .................. 714/8 |
| 6,269,431 B1 * | 7/2001 | Dunham ..................... 711/162 |
| 6,353,878 B1 * | 3/2002 | Dunham ..................... 711/162 |
| 6,366,987 B1 * | 4/2002 | Tzelnic et al. .............. 711/162 |
| 6,385,707 B1 * | 5/2002 | Maffezzoni ................. 711/162 |
| 6,397,229 B1 * | 5/2002 | Menon et al. .............. 707/204 |
| 6,424,999 B1 | 7/2002 | Arnon et al. |
| 6,490,598 B1 | 12/2002 | Taylor |
| 6,715,048 B1 | 3/2004 | Kamvysselis |
| 6,721,766 B1 | 4/2004 | Gill et al. |
| 6,742,138 B1 | 5/2004 | Gegne et al. |
| 6,772,198 B1 | 8/2004 | Arnon et al. |
| 6,820,171 B1 * | 11/2004 | Weber et al. ............... 711/114 |
| 6,865,655 B1 | 3/2005 | Andersen |
| 6,871,271 B1 | 3/2005 | Orhan et al. |
| 6,871,295 B1 | 3/2005 | Ulrich et al. |
| 6,880,051 B1 * | 4/2005 | Timpanaro-Perrotta ..... 711/162 |
| 6,901,493 B1 * | 5/2005 | Maffezzoni ................. 711/162 |
| 2003/0177149 A1 * | 9/2003 | Coombs ..................... 707/204 |
| 2003/0177324 A1 * | 9/2003 | Timpanaro-Perrotta ..... 711/162 |
| 2004/0078637 A1 | 4/2004 | Tellin et al. |
| 2004/0078639 A1 | 4/2004 | Anna et al. |
| 2004/0163029 A1 | 8/2004 | Foley et al. |
| 2004/0172577 A1 | 9/2004 | Tan et al. |
| 2004/0193950 A1 | 9/2004 | Gagne et al. |
| 2004/0268067 A1 | 12/2004 | Kenji |
| 2004/0268178 A1 | 12/2004 | Fredin |

OTHER PUBLICATIONS

"EMC Data Manager—Console User Guide, Release 5.0.0," EMC2 Corporation, Nov. 2002 (20 Pages).

* cited by examiner

*Primary Examiner*—Tuan V. Thai
(74) *Attorney, Agent, or Firm*—Robert C. Kowert; Meyertons, Hood, Kivlin, Kowert & Goetzel, P.C.

(57) ABSTRACT

System and method for performing restores from backups while applications are active and accessing the data being restored. A map correlating destination locations on primary storage to source locations on backup storage for files to be restored may be generated. A restore of the files from the backup storage to the primary storage may be started. During the restore, one or more blocks of data of a file needed by an application may be determined. The map may be accessed to determine if the blocks have been restored. If the blocks have not been restored, the blocks may be restored from the backup storage to the primary storage. The restored blocks of data are accessible by the application while the restore is in progress. The map may be updated to indicate blocks of data that have been restored to the primary storage.

25 Claims, 5 Drawing Sheets

DATA RESTORE MECHANISM

BACKGROUND OF THE INVENTION

1. Field of the Invention

This invention is related to the field of computer systems and, more particularly, to restoring data from backup storage.

2. Description of the Related Art

In disaster recovery backups, data is physically transferred from the primary storage media to the backup media. The backup may be to either disk or tape, though tape has traditionally dominated this market. With the continuing reduction in the cost of disk storage more sites are switching to disks as the backup media. In addition to the lower cost, disk storage tends to occupy less space and is faster than tape. While disk tends to be faster than tape, it should be noted that disk backups and restores typically result in a considerable amount of application down time (typically hours).

In high-end applications, primary storage disks are typically high performance (e.g. EMC, Hitachi, or IBM arrays). Purchasing and maintaining equivalent sets of disk arrays to perform mirroring can be very expensive. Therefore, many sites use inexpensive, mediocre-performance solutions for backup storage (e.g. arrays of IDE disks). Typically, users of such high-end applications do not use such backup storage as "mirrors" that can be switched to and run off backup storage due to the poor performance of the backup storage. For this and other reasons, mirroring and switching to a backup image to run in a production system may not be a viable solution for many enterprises.

In addition, disaster recovery backups are typically not just copies of data like mirrors. A backup application may include backup-specific information or formatting with the backed-up data. A backup application may write to disk like it is writing to tape, e.g. in TAR format. Therefore, the backed-up data in backup storage may not be in a format that can be switched to directly to serve as the primary data in a production system.

In general, data moved to or from storage devices is provided using either block-level or file-level access. File level access requires some knowledge of the underlying file system and/or volume management system used to organize data on the storage devices. This type of information is typically available only at the host level, and thus I/O operations utilizing file-level access must be performed or at least managed by software executing on a host computer. Block-level access uses physical storage device addresses to access data and thus need not be "assisted" by some entity having file system and/or volume knowledge.

A data restore application may restore data from backup storage to primary storage using the addresses of the source and destination devices and blocks. Such address information is typically in the form of an extent list having one or more extents. An extent is typically a contiguous set of storage blocks allocated for a file portion, a file, or multiple files. Extents are typically represented by a device address indication, a starting block address on that device, and a length (number of contiguous blocks). However, extents can be defined in a variety of different ways, e.g., a starting address and an ending address, no device information explicitly included, etc. Thus, an extent is generally any information used to locate a desired portion of a storage resource.

Typically, during restores, an application will have to wait for a file to be fully restored before accessing the file. Since a restore operation may restore files in any order, an application may have to wait a considerable amount of time for a particular file to be fully restored. Large databases may include hundreds of gigabytes or even terabytes of data; restores of these databases may take hours or even days before the data reaches a stable state. In many cases, applications may have to wait until all of the data is restored before they can access any of the data.

Therefore, it is desirable to provide a restore mechanism that has reduced impact on production applications. It is also desirable to restore data needed from disk-based disaster recovery backups in a near instantaneous manner from the production application's perspective. It is also desirable to allow application to be active and accessing data being restored while the restore is in progress transparent to the applications.

SUMMARY

Embodiments of a system and method for performing restores from backups while applications are active and accessing the data being restored are described. Embodiments may provide a restore mechanism that may restore data in near real-time from a disk-based backup through a coupling of a restore application with a file system and/or volume manager. Embodiments may allow restoring data into a file system while one or more applications that may use the data being restored are active. Embodiments may allow users to get backup data from backup storage onto primary storage as rapidly as possible while the restore is taking place with limited or no impact on the application(s).

To perform restores from backups while applications are active and accessing the data being restored according to one embodiment, a map correlating destination locations on primary storage to source locations on backup storage for a set of files to be restored may be generated. A restore of the set of files from the backup storage to the primary storage may be started. During the restore, it may be determined that one or more blocks of data of a file in the set of files is needed by an application. The map may be accessed to determine if the blocks have been restored. If the blocks have not been restored, the blocks may be restored from the backup storage to the primary storage. The restored blocks of data are accessible by the application while the restore is in progress. The map may be updated to indicate blocks of data that have been restored to the primary storage.

One embodiment may generate a map that depicts the file system after the restore is complete. The map describes the blocks that will be restored to the file system and their origin location on the backup disk. By providing the map of the blocks being restored to the file system, and continuously updating the map as to which block have been restored, the file system may determine if a block has already been restored, and if not to request an immediate restore of any required blocks.

Embodiments may be implemented in Storage Area Network (SAN) environments or other types of network storage environments. Embodiments may also be implemented in non-networked storage environments, for example in a single-machine system.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for performing restores from backups while applications are active and accessing the data being restored are described. Embodiments may provide a restore mechanism that may restore data in near real-time from a disk-based backup through a coupling of the restore application with the file system and/or volume manager. Using embodiments, a block-level restore may be performed while the application(s) that access the data is active. In one embodiment, the file system and/or volume manager may determine if blocks of data needed by active applications have been restored. In one embodiment, if a block has not yet been restored, the file system and/or volume manager generates a request to the restore application to have the block immediately restored. In another embodiment, the file system or volume manager may have direct access to the backup storage, and thus may directly access and restore the needed block(s) without going through the restore application. In this embodiment, the restore application may determine or be notified that the needed blocks have been restored to avoid overwriting the blocks. Embodiments of the restore mechanism may allow blocks of data to be restored to primary storage on demand and out-of-order from backup storage.

Embodiments may allow restoring data into a file system while one or more applications that may use the data being restored are active. In the prior art, an application may have to wait for a file to be fully restored before accessing the file, and in many cases applications may have to wait until all of the data is restored before they can access the data. Embodiments may allow users to get backup data from backup storage onto primary storage as rapidly as possible while the restore is taking place with limited or no impact on the application(s).

One embodiment may generate a map that depicts the file system after the restore is complete. In one embodiment, this map may be generated by the restore application. In another embodiment, the map may be generated by the file system. The map describes the blocks that will be restored to the file system and their origin location on the backup disk. By providing the map of the blocks being restored to the file system, and continuously updating the map as to which block have been restored, the file system may determine if a block has already been restored, and if not to request an immediate restore of any required blocks.

Embodiments may be implemented in Storage Area Network (SAN) environments or other types of network storage environments. Embodiments may also be implemented in non-networked storage environments, even in a single-machine system.

Figure 1:
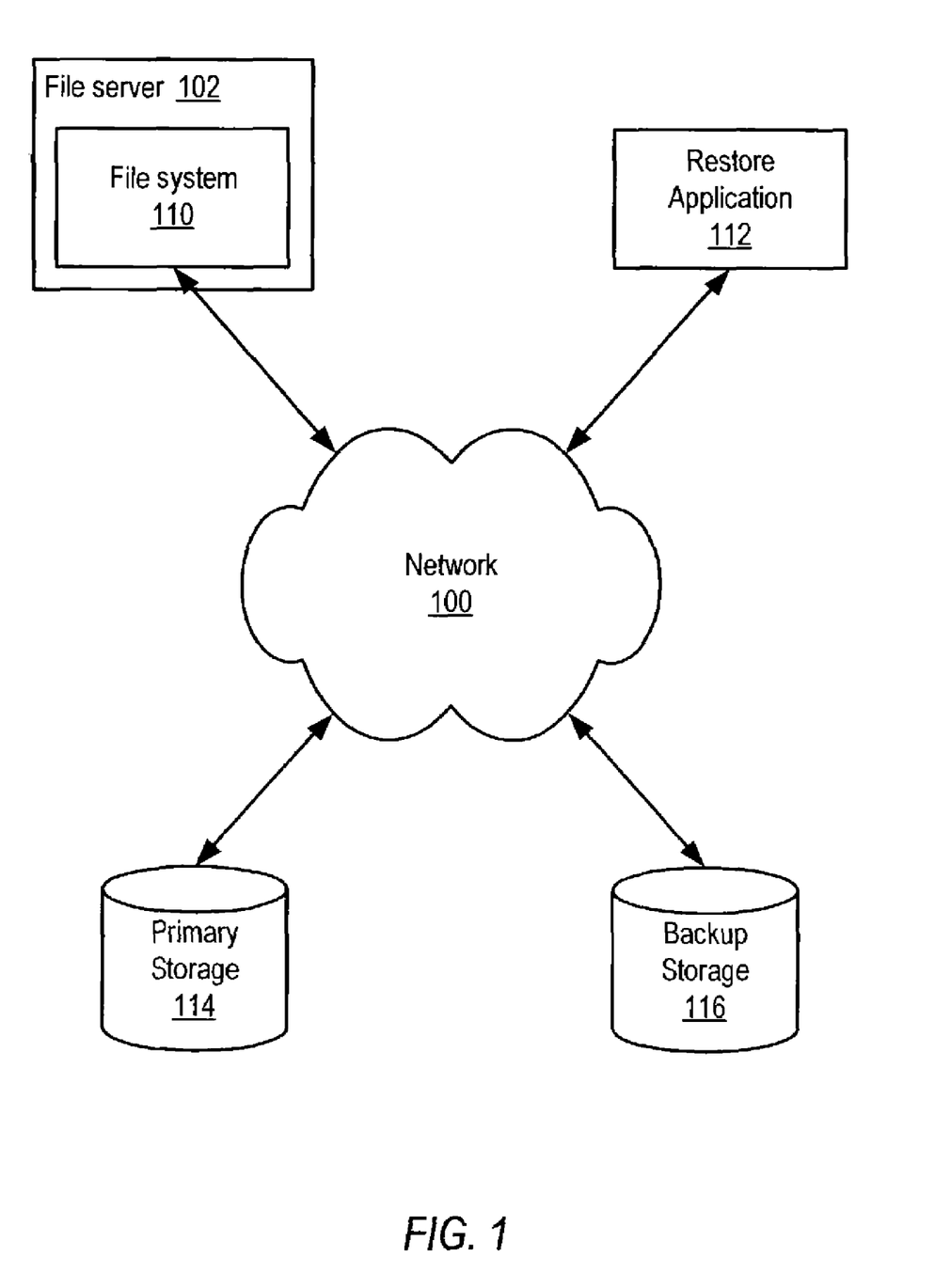
FIG. 1 illustrates a network environment in which the restore mechanism may be implemented according to one embodiment.

FIG. 1 illustrates a network environment in which the restore mechanism may be implemented according to one embodiment. In one embodiment, the restore mechanism may map the files to be restored. In one embodiment, file system 110 and restore application 112 may be on different servers (e.g. in this illustration, file system 110 is on file server 102, and restore application 112 may be on another server such as a media server). In one embodiment, restore application 112 may be on file server 102 with file system 110. In one embodiment, part of restore application 112 may be on file server 102 (e.g. an engine or driver) while the rest of restore application may be on another server (e.g. a media server).

In one embodiment, the file system 110 may allocate blocks for the files on the primary (destination) storage 114; there may be no application data in the blocks when allocated. The locations on the backup storage 116 where the data to be restored is located may be determined. In one embodiment, the restore application 112 may perform the determination. A correspondence or map of where the data is coming from on the backup storage and where the data is going to on the primary storage may be generated. This map may be a bitmap, linked list, or any other suitable data structure. This map may pair the source and destination of blocks to be restored. The map may include indications of whether particular blocks or extents including blocks have been restored. This map may be located on the file server 102, a media server (not shown), on a server with the restore application 112, or on any server (or storage system) in the network environment where it is accessible by both the file system 110 and the restore application 112.

In one embodiment, the map generation may be performed by coupling the restore application 112 with the file system 110. In one embodiment, the generation of the map may be performed at the file server level. In one embodiment, the file system 110 may generate the map. During the restore operation, the map may be updated to indicate which blocks or extents have been restored. In one embodiment, the restore application 112 may maintain the map. In another embodiment, the file system 110 may maintain the map. In yet another embodiment, both the file system 110 and the restore application 112 may maintain the map. In other embodiments, other entities (e.g. a driver or engine on file server 102 or a volume manager) may maintain the map.

One embodiment may include a media server (not shown) that may perform block detection (e.g. detecting when blocks are needed by applications running during the restore), checking of the map to determine if needed blocks have been restored, and on-demand requesting of non-restored blocks. When the file system 110 or alternatively a media server determines that an application needs a block of data in the restore, the file system 110 or media server may examine the map to determine if the block has been restored. In one embodiment, during the restore, when an application needs a block that has not been restored from the backup storage 116 to the primary storage 114 by the restore application 112, the file system 110 or alternatively a media server operating in conjunction with the file system sends a request to the restore application 112 to immediately restore the block from the backup storage 116 to the primary storage 114. Alternatively, the restore application 112 may provide the requested block directly to the requestor (e.g. file system 110).

In one embodiment, detection and request for the immediate restore of non-restored blocks occurs within the file server 102. In this embodiment, detection and request for blocks is performed at a software level on the file server 102 and not at the storage hardware level. In one embodiment, detection of needed blocks may be performed by the file system 110. In this embodiment, the file system 110 determines that there is a block that is needed that has not yet been restored by examining the map and makes a request to the restore application 112 to immediately restore the block. In one embodiment, a driver on the file server 102, rather than the file system 110, may perform the detection and request for non-restored blocks. Alternatively, a media server between the file server 110 and the primary and backup storage may perform non-restored block detection and requests for the immediate restore of non-restored blocks.

Referring to FIG. 1, in some network storage environments such as SAN environments, the file server 102 may have direct access to the backup storage 116. In these environments, in one embodiment, the file server 102 may retrieve blocks from the backup storage 116 that it needs and that have not been restored as indicated by the map. The file server 102 may then update the map to indicate that the block has been retrieved and restored. Thus, in this embodiment, the file server 102 may satisfy the on-demand request on its own without sending a request to the restore application 112. In this embodiment, the file server 102 may do the work that the restore application 112 would otherwise have to do, preferably reducing the number of messages and other operations that have to be performed and thus causing less impact to the overall restore process.

In this embodiment, the file server 102 may coordinate on-demand restores with the restore application 112, e.g. by updating the map, to prevent the restore application 112 from overwriting blocks restored to primary storage 114 with potentially older data from the backup storage 116. In one embodiment, the file server 102 may update the map to indicate that a retrieved block has been restored, and the restore application 112 may check the map to determine if blocks it is about to restore have already been restored and not restore any blocks that have been restored directly by the file server 102 to thus avoid overwriting blocks already retrieved by the file server 102 and possibly modified by applications. In another embodiment, the file server 102 may notify the restore application 112 when it directly retrieves blocks and the restore application 112 may update the map.

One embodiment may include a media server between the file server 110 and the storage. In one embodiment, the restore application 112 may run on the media server. In one embodiment, the media server may handle detection of blocks, checking of the map, and interacting with the restore application for the on-demand restore of detected blocks. In another embodiment, the file server may handle detection of blocks, checking of the map, and interacting with the restore application for the on-demand restore of detected blocks. In one embodiment, a file system on the file server may perform these tasks. In another embodiment, a driver on the file server may perform these tasks. One embodiment may not have a separate media server. In one embodiment, the restore application may run in the file server. One embodiment may be implemented on one server and one storage network. In one embodiment, the restore application may have an engine running on the file server that moves the data and that is coupled with the file system; the map may be maintained in the file server. The engine may move the data from backup storage to primary storage. If file system needs some blocks that have not been restored, the file system notifies the engine to get and restore the indicated blocks.

One embodiment may be implemented in network environments that include a volume manager. A volume manager typically sits under the file system 110 and is used to aggregate groups of storage devices together to form larger views of storage (e.g. striped or concatenated). A volume manager may provide a uniform, singular space in which the file system 110 may operate. Multiple disks can be made to appear as one storage system to the file system 110. In this embodiment, the file system 110 may perform the pre-mapping of the files. The file system 110 may allocate storage where the data is to be restored, as files may typically be identified at the file system 110 level and not at the volume manager level. In one embodiment, detection of blocks, checking of the map, and making on-demand requests to the restore application for the restore of needed blocks may be performed at the file system 110 level. In another embodiment, block detection, map checking, and on-demand requests to the restore application may be performed at the volume manager level.

In embodiments, address spaces may be translated; for example, the file system 110 addresses at the file level, other levels may address at the block or extent level, and lower levels address at the physical level (e.g. using LUNs). Embodiments may include or alternatively access a mapping mechanism that may be used to map addresses to whatever layer is necessary to perform the mapping and/or on-demand restore operations.

Figure 2:
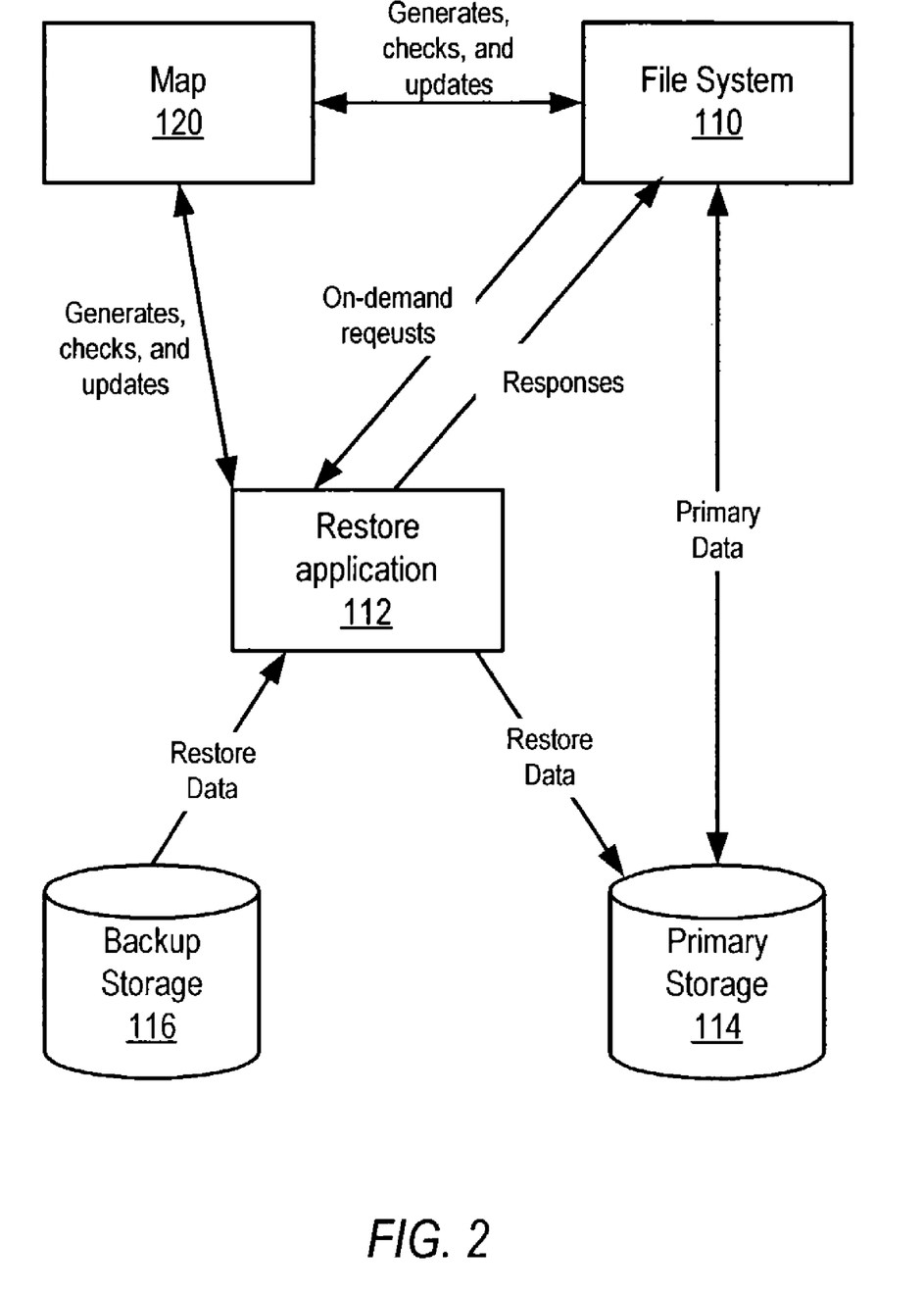
FIG. 2 illustrates the restore mechanism with a map correlating source locations to destination locations for data of a restore according to one embodiment.

FIG. 2 illustrates the restore mechanism with the map according to one embodiment. FIG. 2 illustrates means for restoring a set of files from a backup storage to a primary storage, means for determining on a file server that one or more blocks of data of a file in the set of files needed by an application have not been restored during the restore, and means for restoring the determined one or more blocks of data according to one embodiment.

In one embodiment, a set of files may need to be restored. The restore application 112 may be requested to restore the set of files. The restore application 112 may communicate with the file system 110 to inform the file system 110 to pre-allocate the set of files. The restore application 112 may provide the file names and size of the files, and potentially other information about the set of files. The file system 110 may pre-allocate space (blocks or extents) for the set of files on primary storage 114 and return to the restore application 112 information describing the set of destination blocks (or extents) on the primary storage 114 to where the data is to be restored. The restore application 112 then may pair that set of destination blocks on the primary storage 114 with the source locations of the blocks on the backup storage 116 to generate a map 120.

Figure 3:
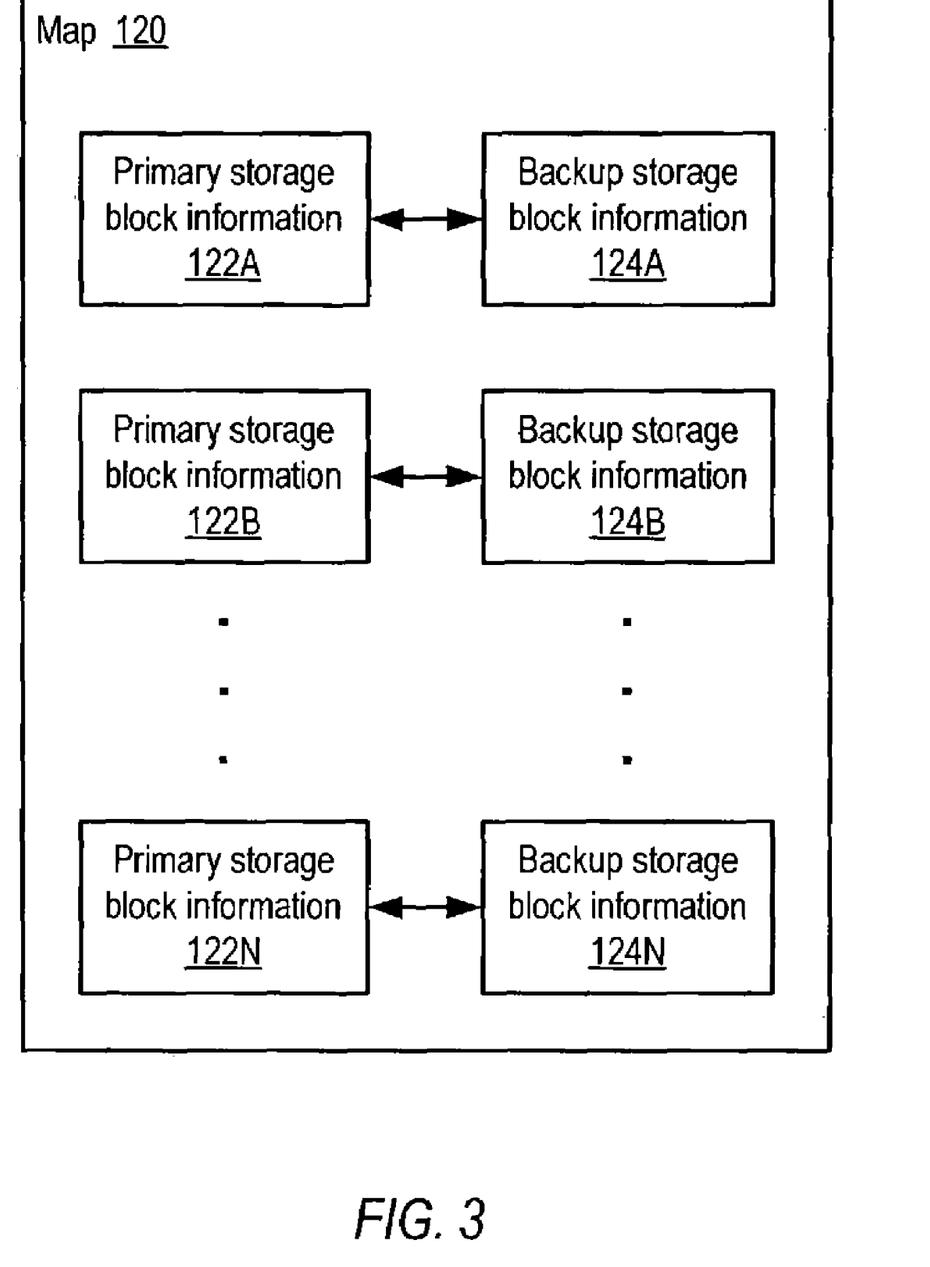
FIG. 3 illustrates a map that correlates source locations to destination locations for data of a restore according to one embodiment.

FIG. 3 illustrates a map according to one embodiment. In FIG. 3, primary storage block information 122 is correlated with backup storage block information 124 for the N blocks or extents to be restored. Map 120 may be a bitmap, linked list, or any other suitable data structure. In one embodiment, for each file in the restore, there may be a map 120 generated for that file that correlates source and destination information for the file. In another embodiment, there may be one map 120 generated that correlates source and destination information for all files in the restore. Other embodiments may generate separate maps 120 for each of two or more sets of files. In one embodiment, this mapping of source and destination information may be performed for all files to be restored up front, before the restore of the files actually starts. Therefore, all the blocks for all the files to be restored may be pre-mapped at the beginning of the restore process. This pre-allocation and pre-mapping process may, for example, take seconds to minutes.

Referring again to FIG. 2, in one embodiment, the file system 110 may maintain the map 120 that it uses to determine what blocks of the set of files that are being restored are currently valid in (restored to) the primary storage 114. The map 120 may be dynamically updated as the restore is performed, in one embodiment by the file system 110, in another embodiment by the restore application 112, or in yet another embodiment by both. In some embodiments, other entities such as a driver or a media server may access and/or update the map 120. In one embodiment, the restore application 112 may keep the map updated to indicate which blocks have been restored. In another embodiment, the restore application 112 may send messages to the file system 110 indicating which blocks have been restored, and the file system 110 may update the map 120. In one embodiment, both the file system 110 and the restore application 112 may update the map 120 when necessary. In some embodiments, other entities such as a media server or a driver on the file server may maintain and/or update the map 120.

In one embodiment, when the file system 110 needs to access a block on the primary storage 114, it checks the map 120 to see if the block has been restored. If the block has not been restored, the file system 110 knows that it cannot access the block directly from the primary storage 114. The file system 110 then sends a request to the restore application 112 that indicates that the file system 110 needs the block immediately. The restore application 112 then goes to the backup storage 116 and gets the block. In one embodiment, the restore application 112 may restore the requested block to the primary storage 116 and notify the file system 10 that the block has been restored. In another embodiment, the restore application 112 may provide the block directly to the file system 110, which may then write the block to the primary storage 114. In both embodiments, the map 120 is updated to indicate that the block has been restored. In one embodiment, the file system 110 may update the map 120. In another embodiment, the restore application 112 may update the map 120. Alternatively, the restore application 112 may restore the block to the primary storage 114, update the map 120, and the file system 110 may check the map 120 to detect if the block has been restored.

Thus, in embodiments, the restore application 112 may get the block from the backup storage 116 and make it available to the file system 110 in response to the file system 110 sending a message to the restore application 112 indicating it needs the block. The map 120 is updated to indicate the block has been restored. In addition, the map 120 is updated to indicate non-requested blocks restored to primary storage 114 by the restore application 112 in the course of the normal restore process. The file system 10 may thus provide blocks of files from the backup storage 116 to an application for access (read or write) while the restore is in progress. At the same time the file system 110 may be making on-demand requests for needed blocks to be immediately restored, the restore may be proceeding as normal; the restore application 112 may be moving other, non-requested blocks from the backup storage 116 to the primary storage 114. The restore may be proceeding normally in the background while on-demand restores may be occurring if the file system 110 determines blocks that it needs have not yet been restored.

While the data is being moved, the map 120 is being updated so that the map 120 reflects what has been restored to the primary storage 116. If the file system 110 checks the map 120 and sees that a block it needs has not yet been restored, the file system 110 notifies the restore application 112 to provide the block immediately.

In one embodiment, if a file access by an application does not involve a file that is being restored, then the file system 110 may determine that it does not have to check the map to determine if the file's blocks have been restored. In one embodiment, the restore application 112 may inform the file system 110 when the restore has completed so that the file system 110 will know it no longer needs to check the map 120 and the map 120 may be disposed of if desired.

In one embodiment, each file's metadata may include an indication to mark if the file is to be restored. When the file system 110 receives a request for a file or a portion of a file, the file system 110 may check the metadata for the file to determine if the file is to be restored. If it is to be restored, then the file system may check the map 120 for that file to determine if the needed blocks have been restored. If the needed blocks have not been restored, then the file system 110 may send a request to the restore application 112 to immediately restore the needed blocks. In one embodiment, the file system 110 may check the file's metadata to determine if the file has been restored; if the file has been restored, then the file system 110 can serve the request without checking the map 120; otherwise, the file system 110 checks the map 120 and, if the map 120 indicates the needed blocks have not been restored, notifies the restore application 112 to restore the needed non-restored blocks.

Figure 4:
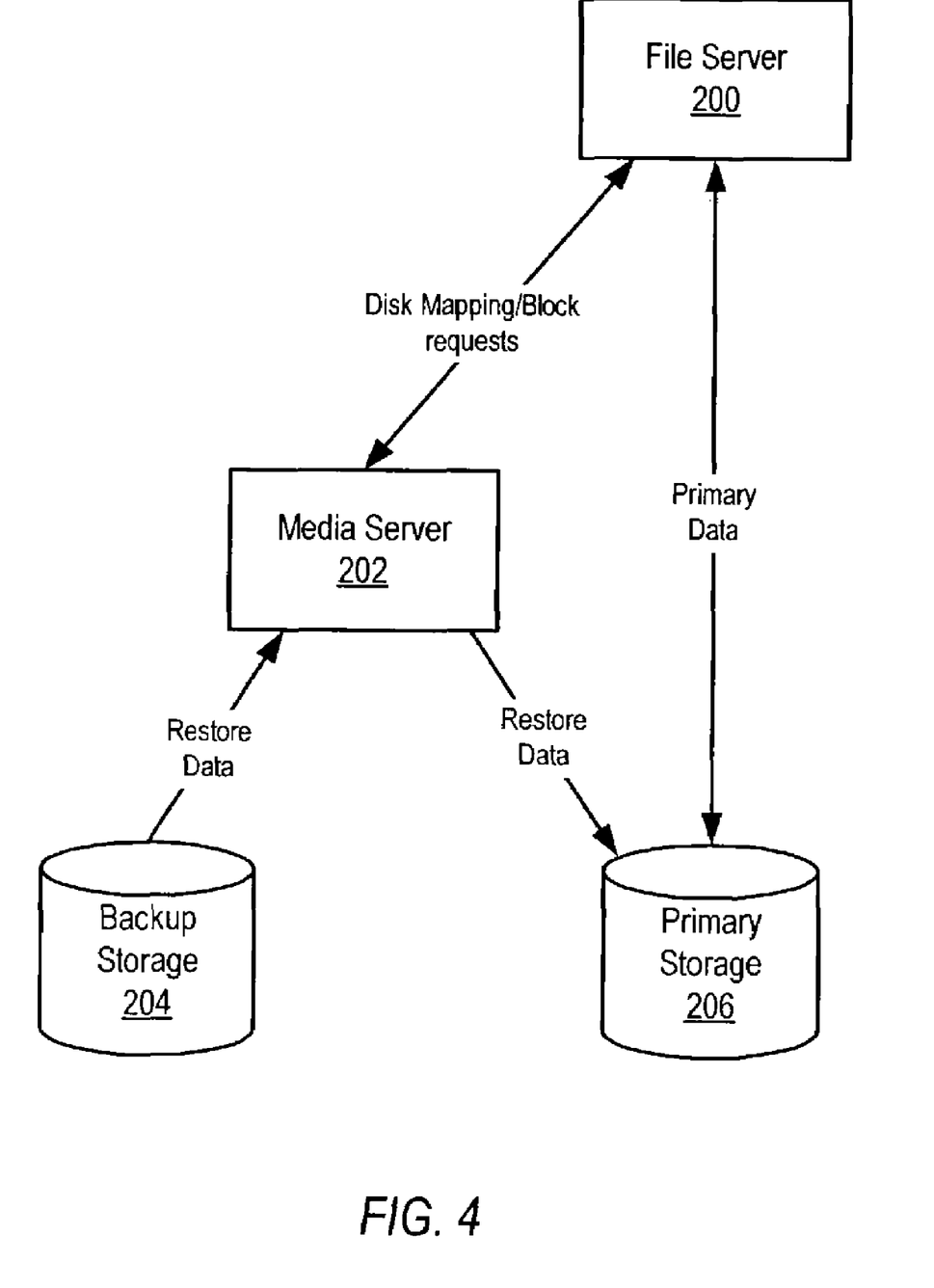
FIG. 4 illustrates the restore mechanism in an environment with a media server according to one embodiment.

FIG. 4 illustrates the restore mechanism in an environment with a media server according to one embodiment. Primary storage 206 may be, for example, a disk array that holds the data being accessed by the file server 200 and to which a restore is being performed. The backup storage 204 may hold the data that was previously stored as part of a backup operation. In one embodiment, the restore application may reside primarily on the Media Server 202. In one embodiment, some components of the restore application may reside on the File Server (client) 200. In one embodiment, when a request is made to restore some files, the files may be pre-allocated and mapped by the restore application using the capabilities of the file system on file server 200. The extents pre-allocated by the file server 200 may be transferred to the Media Server 202, and the restore application may correlate the location of the data on the backup storage 204 to the extents on the Primary Storage 206. Once the correlation is completed, the media server 202 may provide the file system on file serve 200 a map of the blocks that are in the process of being restored. The file system may use this map to make a determination if the data on the primary storage 206 is current or is in the process of being restored. If a data block is required that has not yet been restored to the primary storage 206, then the file system may make a request to the restore application for an immediate restore. The restore application may preferably immediately retrieve requested data blocks and mark the blocks as having been restored. The file system may then proceed with the storage request. The restore application may be concurrently restoring data from the backup storage 204 to the primary storage 206. The map may be updated, for example, but not necessarily, at regular intervals, to indicate the blocks that have been restored.

In one embodiment, the backup storage 206 may be directly accessible to the File Server 200. In this embodiment, the file system may directly read blocks from the backup storage 204 based on the extent mappings created by the restore application.

Embodiments may include at least some integration between the file system and the restore application. In one embodiment, the file system pre-allocates and maps the restore storage on primary storage 206. In one embodiment, the file system checks the map (e.g. bitmap, linked list or other structure) to determine if the current block being accessed has been restored. If a block has not yet been restored, then the file system requests the block be immediately restored or, alternatively, accesses the backup storage 206 for the specific block. When notified of the block's availability, the file system may proceed with the I/O access (e.g. generated by an application). In one embodiment, during the restore process with on-demand restores of blocks, the file system may run in a degraded state; however, customers may prefer to run in a degraded state than to have the application down throughout the restore.

One embodiment may include a driver under the file system to monitor the requested blocks and provide the on-demand requests. This embodiment may be used, for example, in environments where the restore application cannot be (fully) integrated with the file system. In this embodiment, pre-allocation and mapping may be performed by the file system.

Figure 5:
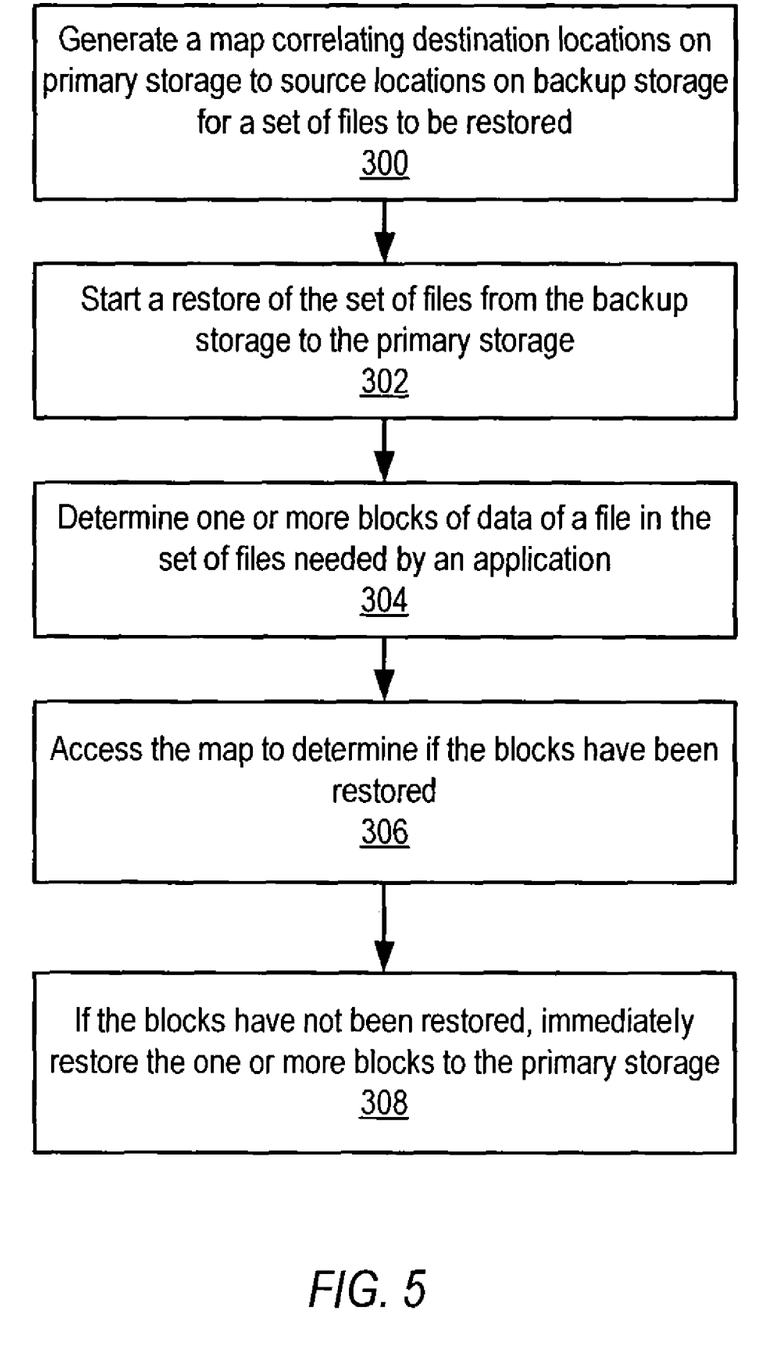
FIG. 5 is a flowchart of a method for performing restores from backups while applications are active and accessing the data being restored according to one embodiment.

FIG. 5 is a flowchart of a method for performing restores from backups while applications are active and accessing the data being restored according to one embodiment. As indicated at 300, a map correlating destination locations on primary storage to source locations on backup storage for a set of files to be restored may be generated. A restore of the set of files from the backup storage to the primary storage may be started as indicated at 302. As indicated at 304, during the restore, it may be determined that one or more blocks of data of a file in the set of files is needed by an application. As indicated at 306, the map may be accessed to determine if the blocks have been restored. As indicated at 308, if the blocks have not been restored, the blocks may be restored from the backup storage to the primary storage. The restored one or more blocks of data are accessible by the application while the restore is in progress. The map may be updated to indicate blocks of data that have been restored to the primary storage.

In one embodiment, a restore application performs the map generation and the restore of the set of files from the backup storage to the primary storage. In one embodiment, a file system performs the determining of the one or more blocks of data needed by the application and accessing the map to determine if the blocks have been restored. In one embodiment, if it is determined that the blocks have not been restored, the file system sends a message to the restore application to instruct the restore application to restore the blocks. In this embodiment, the restore application restores the blocks of data to the primary storage in response to the message.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a primary storage;
   a backup storage;
   a restore application configured to restore a set of files from the backup storage to the primary storage; and
   a file server configured to, during said restore:
      determine that one or more blocks of data of a file in the set of files needed by an application have not been restored; and
      direct the restore application to restore the determined one or more blocks of data in response to said determination that the one or more blocks of data have not been restored;
   wherein the restored one or more blocks of data are accessible by the application while said restore is in progress.

2. The system as recited in claim 1,
   wherein the restore application is further configured to, prior to said restore, generate a map correlating destination locations on the primary storage to source locations on the backup storage for the set of files to be restored; and
   wherein, to determine that one or more blocks of data of a file in the set of files needed by an application have not been restored, the file server is further configured to access the map to determine if the one or more blocks have been restored.

3. The system as recited in claim 2, wherein for at least one file of the set of files that comprises a plurality of data blocks, the map comprises a separate correlation of each block of the plurality of data blocks at the primary storage to a corresponding block at the secondary storage.

4. The system as recited in claim 1,
   wherein, to direct the restore application to restore the determined one or more blocks of data in response to said determination that the one or more blocks of data have not been restored, the file server is configured to send a message to the restore application, wherein the message is configured to direct the restore application to restore the determined one or more blocks of data; and
   wherein the restore application is further configured to restore the one or more blocks of data to the primary storage in response to the message.

5. The system as recited in claim 1, wherein the file server comprises a file system configured to perform said determination that one or more blocks of data of a file in the set of files needed by an application have not been restored and said direction of the restore application to restore the determined one or more blocks of data.

6. The system as recited in claim 1, wherein the file server comprises a file system and a driver coupled to the file system, wherein the driver is configured to perform said determination that one or more blocks of data of a file in the set of files needed by an application have not been restored and said direction of the restore application to restore the determined one or more blocks of data on behalf of the file system.

7. The system as recited in claim 1, wherein the restore application is further configured to update the map to indicate blocks of data that have been restored to the primary storage.

8. The system as recited in claim 1, wherein the system is a Storage Area Network (SAN) system.

9. The system as recited in claim 1, wherein, prior to said determination that the one or more blocks of data have not been restored, the file server is further configured to:
receive a file access request from the application, wherein the file access request specifies a portion of the file to be accessed by the application, wherein the file access request is received while said restore is in progress;
identify a set of blocks of data of the file corresponding to the portion of the file, wherein the set of blocks comprises the one or more blocks.

10. The system as recited in claim 9, wherein the file access request specifies the portion of the file using file level addressing, wherein said identifying the set of blocks comprises translating a file level address to a block-level address.

11. The system as recited in claim 9, wherein the file server is further configured to:
identify, from among the set of blocks of data corresponding to the portion of the file, a particular block that does not have to be restored from the backup storage; and
provide access to the particular block of data to the application from the primary storage.

12. The system as recited in claim 1, wherein the restore application is further configured to restore blocks of one or more other files of the set as a background task while restoring the one or more blocks in response to said directing by the file server.

13. A system, comprising:
means for restoring a set of files from a backup storage to a primary storage;
means for determining on a file server that one or more blocks of data of a file in the set of files needed by an application have not been restored during said restore; and
means for restoring the determined one or more blocks of data;
wherein the restored one or more blocks of data are accessible by the application while said restore is in progress.

14. A method, comprising:
a restore application starting a restore of a set of files from a backup storage to a primary storage;
during said restore:
a file server determining that one or more blocks of data of a file in the set of files needed by an application have not been restored; and
the file server directing the restore application to restore the determined one or more blocks of data in response to said determining that the one or more blocks of data have not been restored; and
the restore application restoring the determined one or more blocks of data;
wherein the restored one or more blocks of data are accessible by the application while said restore is in progress.

15. The method as recited in claim 14, further comprising:
prior to said restore, generating a map correlating destination locations on the primary storage to source locations on the backup storage for the set of files to be restored; and
wherein said determining that one or more blocks of data of a file in the set of files needed by an application have not been restored comprises accessing the map to determine if the one or more blocks have been restored.

16. The method as recited in claim 14,
wherein said directing the restore application to restore the determined one or more blocks of data comprises sending a message to the restore application, wherein the message is configured to direct the restore application to restore the determined one or more blocks of data; and
wherein the restore application restores the determined one or more blocks of data in response to the message.

17. The method as recited in claim 14, wherein the file server comprises a file system, wherein the file system performs said determining that one or more blocks of data of a file in the set of files needed by an application have not been restored and said directing the restore application to restore the determined one or more blocks of data.

18. The method as recited in claim 14, wherein the file server comprises a file system and a driver coupled to the file system, wherein the driver performs said determining that one or more blocks of data of a file in the set of files needed by an application have not been restored and said directing the restore application to restore the determined one or more blocks of data on behalf of the file system.

19. The method as recited in claim 14, further comprising updating the map to indicate blocks of data that have been restored to the primary storage.

20. A computer-accessible medium comprising program instructions, wherein the program instructions are configured to implement:
a restore application starting a restore of a set of files from a backup storage to a primary storage;
during said restore:
a file server determining that one or more blocks of data of a file in the set of files needed by an application have not been restored; and
the file server directing the restore application to restore the determined one or more blocks of data in response to said determining that the one or more blocks of data have not been restored; and
the restore application restoring the determined one or more blocks of data;
wherein the restored one or more blocks of data are accessible by the application while said restore is in progress.

21. The computer-accessible medium as recited in claim 20, wherein the program instructions are further configured to implement:
prior to said restore, generating a map correlating destination locations on the primary storage to source locations on the backup storage for the set of files to be restored; and wherein said determining that one or more blocks of data of a file in the set of files needed by an application have not been restored comprises accessing the map to determine if the one or more blocks have been restored.

22. The computer-accessible medium as recited in claim 20,
wherein, in said directing the restore application to restore the determined one or more blocks of data, the program instructions are further configured to implement sending a message to the restore application, wherein the message is configured to direct the restore application to restore the determined one or more blocks of data; and
wherein the restore application restores the determined one or more blocks of data in response to the message.

23. The computer-accessible medium as recited in claim 20, wherein the file server comprises a file system, wherein the file system performs said determining that one or more blocks of data of a file in the set of files needed by an application have not been restored and said directing the restore application to restore the determined one or more blocks of data.

24. The computer-accessible medium as recited in claim 20, wherein the file server comprises a file system and a driver coupled to the file system, wherein the driver performs said determining that one or more blocks of data of a file in the set of files needed by an application have not been restored and said directing the restore application to restore the determined one or more blocks of data on behalf of the file system.

25. The computer-accessible medium as recited in claim 20, wherein the program instructions are further configured to implement updating the map to indicate blocks of data that have been restored to the primary storage.

* * * * *